United States Patent [19]

Zurecki et al.

[11] Patent Number: 5,294,242
[45] Date of Patent: Mar. 15, 1994

[54] METHOD FOR MAKING METAL POWDERS

[75] Inventors: Zbigniew Zurecki, Macungie; Kerry B. Berger, Lehighton; Robert B. Swan, Bath, all of Pa.

[73] Assignee: Air Products and Chemicals, Allentown, Pa.

[21] Appl. No.: 770,060

[22] Filed: Sep. 30, 1991

[51] Int. Cl.[5] .............................................. B22F 9/14
[52] U.S. Cl. ........................................ 75/345; 75/346; 75/10.1
[58] Field of Search ................ 75/336, 345, 346, 10.1, 75/10.19

[56] References Cited

U.S. PATENT DOCUMENTS

| | | | |
|---|---|---|---|
| 3,041,672 | 7/1962 | Lyle | 75/336 |
| 3,646,177 | 4/1970 | Thompson et al. | 264/12 |
| 4,376,740 | 3/1983 | Uda et al. | 264/10 |
| 4,592,781 | 6/1986 | Cheney et al. | 75/249 |
| 4,613,371 | 9/1986 | Cheney et al. | 75/255 |
| 4,687,510 | 8/1987 | Cheney et al. | 75/331 |
| 4,732,369 | 3/1988 | Araya et al. | 266/207 |
| 4,781,754 | 11/1988 | Soranno et al. | 75/348 |
| 4,897,111 | 1/1990 | Jonsson et al. | 75/337 |
| 4,952,144 | 8/1990 | Hansz et al. | 425/10 |
| 5,062,936 | 11/1991 | Beaty et al. | 75/336 |
| 5,183,493 | 2/1993 | Brandau et al. | 75/335 |

FOREIGN PATENT DOCUMENTS 0134808 1/1984 European Pat. Off. .
2-290245 11/1990 Japan .

OTHER PUBLICATIONS

K. Ishizaki, et al, Direct production of ultra-fine nitrides . . . , pp. 3553–3559, J. of Mat. Sci., vol. 24, 1989.
S. J. Savage, et al, Production of Rapid Solidified Metals and Alloys, Journal of Metals Apr. 1984, pp. 20–32.
R. A. Ricks, et al, Bulk Production of Ultrafine Metallic . . . , pp. 814–817, J. of Mat. Sci. Letters, vol. 4, 1985.
M. G. Chu, et al, Solidification of Highly Undercooled Sn–Pb Alloy Droplets, vol. 15A Jul. 1984 pp. 1303–1310.
James P. Langan, Solder Paste Requirements for Fine–Pitch Technology pp. 51–54, Circuits Assembly, Oct. 1990.
H. W. Bergmann, et al, Production of Metallic Powders by Atomization . . . , vol. 65, No. 6, 1988, pp. 513–531.

*Primary Examiner*—George Wyszomierski
*Attorney, Agent, or Firm*—John M. Fernbacher; James C. Simmons; William F. Marsh

[57] ABSTRACT

A metal powder is produced by atomizing molten metal in an electric arc spray gun and rapidly quenching the resulting droplets in a liquid cryogen to form fine, highly spherical, oxide-free particles. The rapid quenching yields particles with a very fine, uniform microstructure which melt rapidly and uniformly when later heated. The powder is especially well-suited for making solder paste for device fabrication in the electronics industry.

18 Claims, 4 Drawing Sheets

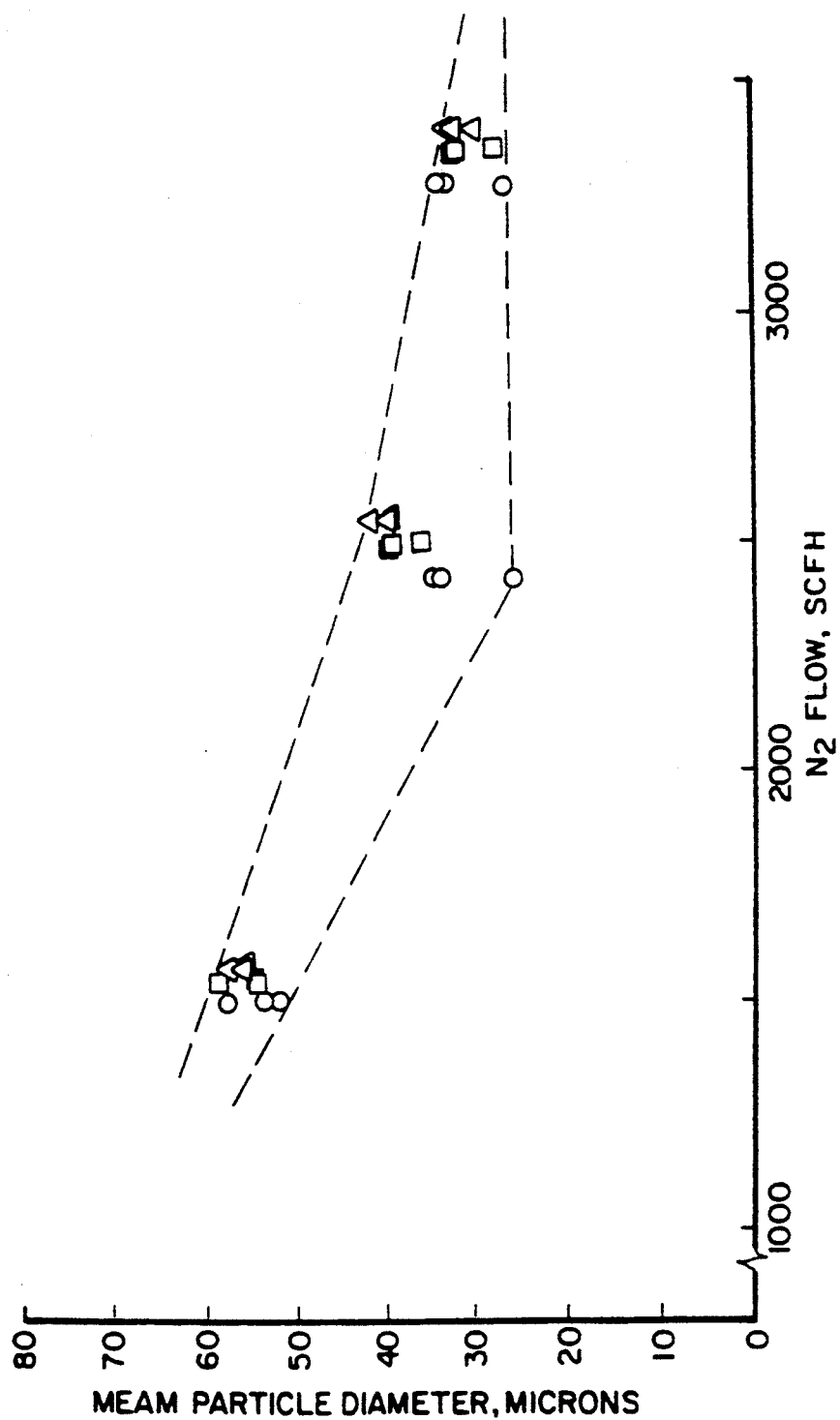

METHOD FOR MAKING METAL POWDERS

FIELD OF THE INVENTION

The present invention is directed to the production of metal powders, and specifically to a method for making metal powders by the rapid solidification of arc-sprayed metal droplets.

BACKGROUND OF THE INVENTION

Metal powders having fine, spherical particles are utilized in the metallurgical, chemical, and electronics industries in the manufacture of a wide variety of products. For applications of metal powders in the electronics industry, it is desirable to produce such powders at high yield and reasonable cost for the preparation of solder pastes for use in the fabrication of high-density electronic circuit boards. In addition, it is desirable that the powders be uniform and free-flowing. An extensive review of methods for making free-flowing metal powders is given by S. J. Savage and F. H. Froes in an article entitled "Production of Rapidly Solidified Metals and Alloys" in *Journal of Metals*, April 1984, pp. 20-32. One category of processes involves the mechanical dispersion of a stream of molten metal into fine droplets followed by quenching and cooling to form solidified particles. Dispersion of the molten metal into droplets is accomplished by (1) impinging one or more high-pressure gas or liquid streams onto the stream of molten metal, (2) dispersing the molten metal stream by various centrifugal means such as rotating discs, cups, or drums, or (3) forming droplets by passing the stream of molten metal between two counter-rotating rollers. Cooling of the molten droplets formed by these methods is accomplished by contact with cool gas, often by the droplets freely falling through a gas-filled cooling tower, or by contacting the droplets with a cooling liquid such as water, oil, or a cryogenic liquid. In two related methods, molten droplets are formed by a rotating consumable arc electrode which emits the droplets tangentially into a cooling gas for solidification, or by directing molten metal from a consumable electrode by electric arc or electron beam. Droplets are cooled by contacting with a high-velocity cooling gas such as helium. All of the methods reviewed in this article are characterized by (1) utilization of mechanical means to form molten metal droplets from previously melted metal and/or (2) the disintegration of a stream of previously melted metal using compressed fluids to form the droplets.

In a method related to those discussed above, a stream of molten metal is dispersed by the impingement of high-velocity streams of a cryogenic liquid followed by further cooling in a bath of the same liquid. Powder product is then recovered from the cryogenic liquid in one or more fractions. Such methods are disclosed in U.S. Pat. Nos. 3,646,177 and 4,897,111, and in an article by H. W. Bergmann et al entitled "Production of Metallic Powders by Atomization of Metallic Melts With Liquid Gases" in *Fertigungs-Technologie*, Volume 65, No. 6, 1988, pp. 513-531. The use of powders made by this method in solder pastes for the fabrication of electronic devices is discussed in a paper entitled "Solder Paste Requirements for Fine-Pitch Technology" by J. P. Langan in *Circuits Assembly*, October 1990, pp. 51-54. The importance of low oxide content and spherical particles in these powders is pointed out in this paper. An analysis of the gas atomization method discussed above is given by R. A. Ricks and T. W. Clyne in an article entitled "Bulk Production of Ultrafine Metallic Powder by High Pressure Gas Atomization" published in *J. Mat. Sci. Letters* 4, (1985), pp. 814-817. The authors studied the effects of nozzle design on particle size distribution in tin and tin-lead powders.

M. G. Chu et al describe an alternate method of making small, highly-undercooled lead-tin alloy particles in an article entitled "Solidification of Highly Undercooled Sn-Pb Alloy Droplets" in *Metallurgical Transactions A*, Vol. 15A, July 1984, pp. 1303-1310. The method is useful for studying the formation and morphology of such droplets and comprises making an emulsion of molten alloy droplets in a high-boiling organic liquid and injecting the emulsion into cold carbon tetrachloride to solidify the droplets. This method is not appropriate for use in commercial production.

An alternate approach to droplet and particle formation differing from the methods described above involves the use of plasma arc systems to form molten droplets which are directly quenched and solidified by various methods. U.S. Pat. No. 3,041,672 discloses a method of feeding a consumable rod or wire into the discharge of a plasma arc wherein the rod is melted and dispersed into fine droplets by the discharged plasma arc gas. The droplets and plasma gas are passed into a collector which cools the particles to form a powder product; the collector contains a cooling liquid such as water. Steel, tungsten, and sapphire particles can be made with average particle diameters between about 150 and 300 microns.

U.S. Pat. Nos. 4,592,781, 4,613,371, and 4,687,501, and European Patent Application EP 0 134 808 B1 disclose a method for making ultrafine metal powders which comprises feeding a powder through an arc or induction plasma torch to generate a stream of molten metal droplets, directing the droplets onto a repellent surface, and solidifying the particles rebounding from the surface. Powders can be made in which at least about 80% of the particles have diameters less than 10 microns; however, the repellant surface quenching mode results in predominantly non-spherical particle shapes.

A process for producing fine particles of metal or alloy is disclosed in U.S. Pat. No. 4,376,740 wherein a molten metal or alloy is atomized by a stream of argon and/or helium heated in a high-temperature plasma, and the molten particles are cooled and recovered as a powder in a cold trap. Particles having diameters less than 5 microns can be made by this process. U.S. Pat. No. 4,732,369 describes an apparatus which operates in a similar manner using a plasma arc to atomize a molten metal or ceramic material, wherein the atomized material is removed by vacuum or suction into a cold trap for solidification and collection as a powder product. Solidification can be promoted by blowing a jet of cold gas on the stream of atomized material as it enters the cold trap.

An article by K. Ishizaki et al entitled "Direct Production of Ultrafine Nitrides and Carbides Powders by the Plasma Arc Method" in the *Journal of Materials Science* 24 (1989), pp. 3553-3559 discusses a method for producing ultrafine powders using an argon-nitrogen plasma gas in conjunction with ammonia-methane mixtures injected into a plasma reaction chamber. Tungsten and titanium carbide powders can be produced with particle diameters in the 5-10 nanometer range; aluminum powders can be made in the 20–50 nanometer range. Low powder yields and explosive/corrosive plasma gases make this method unsuitable for commercial powder production.

U.S. Pat. No. 4,781,754 discloses a method for making fine alloy powders by introducing the alloy as particles into a plasma torch and directing the torch discharge onto an inner surface of a rotating thermally conductive quench cylinder whereby the molten alloy particles are rapidly solidified to yield a powder product. The inner surface of the quench cylinder is typically cooled by applying a liquefied gas such as argon as the cylinder rotates. This method does not produce highly spherical powders. U.S. Pat. No. 4,952,144 describes an apparatus in which molten particles from a plasma torch are quenched, cooled, and solidified by passing the plasma torch discharge through a spray of cryogenic liquid to form a powder product which is captured in a cyclone collector.

Japanese Patent Application No. 2-290245 discloses a method for making uniform ceramic or metal powders of high fluidity by feeding a powder through a plasma torch to form molten droplets which are quenched and solidified in a water bath.

The plasma-based methods described above have certain drawbacks for the large-scale production of metal powders, especially when the droplets must be rapidly quenched. Because the plasma flame is at a very high temperature (typically above 3000° C.), the quench rate of the droplets will necessarily be lower than for alternate methods discussed above due to the large volume of hot plasma gas which must be cooled along with the droplets. Because of a short residence time in the plasma flame, injected powders are frequently overheated at the surface and cooler in the core which can lead to metal evaporation and/or nonuniform particles. Further, when a cryogenic liquid is used for quenching, the consumption of the liquid will be high due to the large volume of hot plasma gas. In addition, most plasma methods require a powder feed which is easily contaminated and have generally low throughputs. The methods described above involving solidification of previously molten metal by mechanical or compressed fluid dispersion do not suffer from the drawbacks of plasma-based methods. However, the methods generally have other drawbacks for producing uniform, fine, oxide-free powders such as lack of flexibility for producing small batches of specialized powders, the presence of contaminants in the powder product, the need for complex and expensive equipment, the need to keep the metal in the molten state during dispersion of a stream thereof, and the handling of cryogenic liquids at extremely high pressures.

Given the present state of the art as reviewed above, there is no optimum method for making fine, spherical, free-flowing, oxide-free metal powders utilizing simple, flexible, and economical equipment. There is a need for an improved method to make such powders for use in a broad range of industries. In particular, there is a need in the electronics industry for improved solder pastes which will require powders containing smaller metal particles with higher sphericity and lower oxide content than are currently available. In addition, improved melting properties of the particles in these solder pastes are needed, and such properties can be obtained if higher quench rates can be achieved in the powder production step. The invention described in the disclosure and claims which follow provides a new and improved method for making metal powders having such properties.

SUMMARY OF THE INVENTION

The invention is a method for producing metal-containing powder comprising the steps of (a) forming an electric arc between two metal-containing wires in an electric arc spray gun, which causes the wires to melt; (b) directing pressurized inert gas across the arc to form molten droplets which are discharged with the inert gas from the gun; (c) contacting the molten droplets and inert gas discharged from the gun with a liquid cryogen, which solidifies the molten droplets to form solid particles, cools the inert gas, vaporizes at least a portion of the liquid cryogen, and forms a mixture of cryogen, cooled inert gas, and solid particles; and (d) separating the solid particles from the mixture to yield the metal-containing powder.

In one embodiment of the invention, the metal-containing powder is produced by (a) forming an electric arc between two metal-containing wires in an electric arc spray gun, which causes the wires to melt; (b) directing pressurized inert gas across said arc to form molten droplets which are discharged with the inert gas from the gun; (c) passing the inert gas and molten droplets discharged from the gun into a vessel containing a liquid cryogen, which solidifies the molten droplets to form solid particles, cools the inert gas, vaporizes at least a portion of the liquid cryogen, and solidifies the molten droplets to form solid particles; and (d) withdrawing from the vessel a mixture of liquid cryogen and solid particles, vaporizing the liquid cryogen, and recovering the solid particles to yield the metal-containing powder.

In another embodiment of the invention, metal-containing powder is produced by (a) forming an electric arc between two metal-containing wires in an electric arc spray gun, which causes the wires to melt; (b) directing pressurized inert gas across the arc to form molten droplets which are discharged with the inert gas from the gun; (c) passing the inert gas and molten droplets discharged from the gun into a first vessel containing a liquid cryogen, which solidifies the molten droplets to form solid particles, cools the inert gas, vaporizes a portion of the liquid cryogen, and solidifies the molten droplets to form solid particles; (d) withdrawing from the first vessel a stream of liquid cryogen and solid particles, vaporizing the liquid cryogen, and recovering the solid particles to yield a first fraction of metal-containing powder; and (e) withdrawing from the first vessel a mixture of cool inert gas, vaporized cryogen, entrained liquid cryogen, and entrained solid particles. This mixture is passed into a second vessel containing additional liquid cryogen wherein the entrained liquid cryogen and entrained solid particles are separated from the vaporized cryogen and cool inert gas; (f) a stream of vaporized cryogen and cool inert gas essentially free of entrained material is withdrawn from the second vessel; and (g) a mixture of liquid cryogen and solid particles is withdrawn from the second vessel, the liquid cryogen is vaporized, and the solid particles are recovered to yield a second fraction of metal-containing powder. The first and second fractions of powder can be separate products, or alternately can be combined into a single product.

BRIEF DESCRIPTION OF THE FIGURES

FIG. 6 is a plot of mean particle size vs nitrogen flow rate for different arc spray gun orifice diameters.

DETAILED DESCRIPTION OF THE INVENTION

The invention is a method for producing metal-containing powders by the rapid quenching and cooling of fine, molten droplets generated by an electric arc spray gun utilizing an inert gas for atomization. The inert gas does not react exothermically with the metal to form thermodynamically stable compounds under the conditions used for spraying. Quenching and solidification of the droplets to form a powder are accomplished by contacting the spray gun discharge with a liquid cryogen in any appropriate manner such that rapid cooling takes place. This is accomplished preferably by passing the gun discharge directly into a pool of cryogen, where the cryogen is liquid nitrogen or liquid argon. By utilizing an arc spray gun for melting and atomization, and by the rapid cooling achieved by direct quenching with a liquid cryogen, the process yields a powder with small, highly spherical particles which are essentially oxide-free and which contain very fine and uniform dendritic microstructure. This powder is especially well-suited for making solder paste for use in the electronics industry in the fabrication of high-density circuit assemblies.

Figure 1:
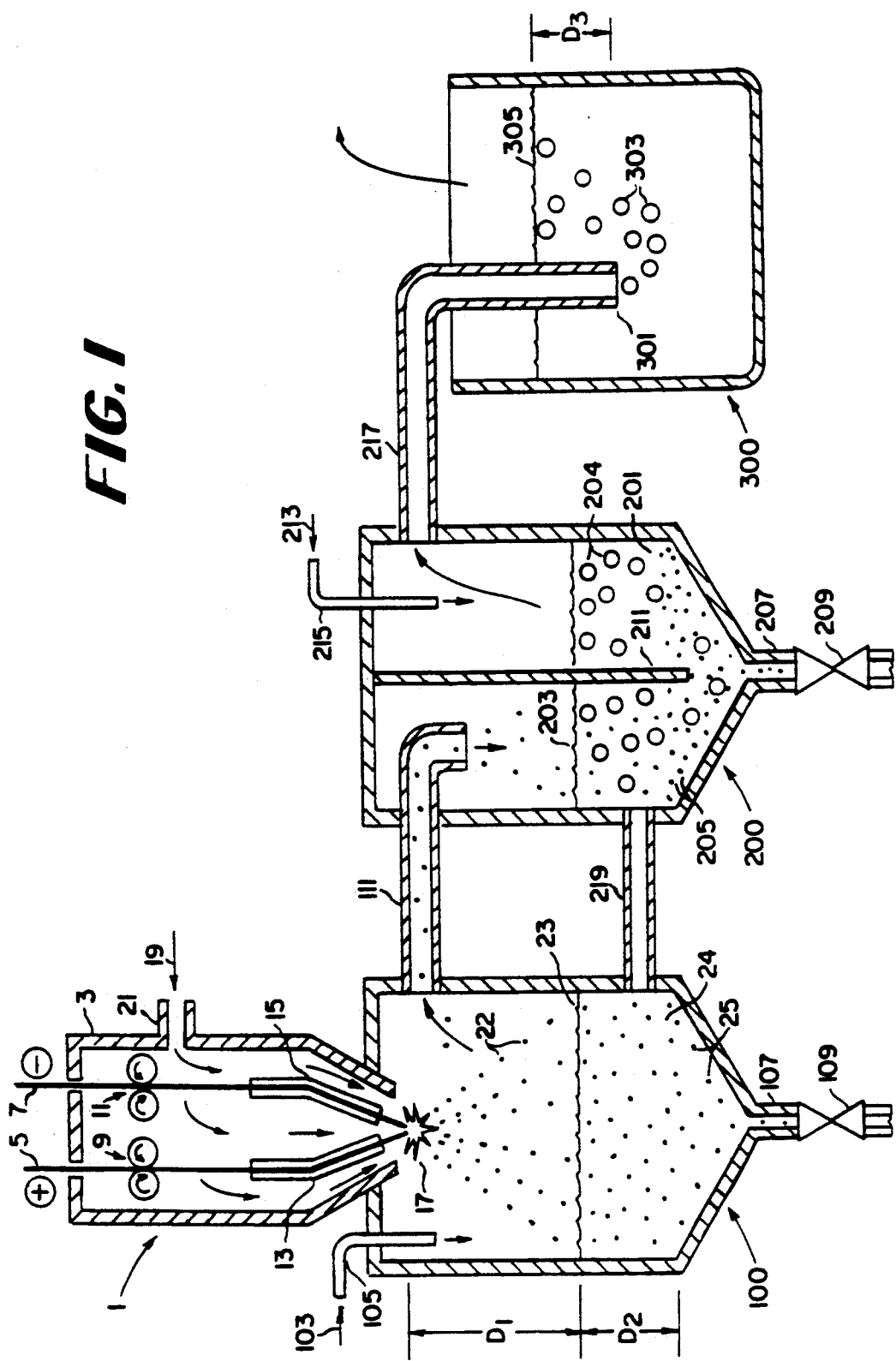
FIG. 1 is a schematic flow diagram of the system utilized in the present invention.

Referring now to the schematic flow diagram of the FIG. 1, arc spray gun 1 enclosed by housing 3 is supplied with conductive feed wires 5 and 7 which are moved through the gun by feed mechanisms 9 and 11. The wires can be solid, cored, or braided and can contain any metal, metal alloy, or ceramic material as long as the wire is electrically conductive and the components can be melted at the conditions in the arc spray gun. The wires, which move through wire guides 13 and 15, are energized by a power supply system (not shown) to provide the current and voltage potential necessary for striking arc 17. The high temperature caused by the current melts continuously fed wires 5 and 7 by electric arc heating localized at the wire tips and by resistance heating of the wire portions extending beyond wire guides 13 and 15 as the wires at-e fed into the arc. Pressurized inert gas 19 flows into the gun and passes across arc 17, thereby shearing and dispersing the molten material to form droplets 22. The arc spray gun is disposed relative to vessel 100 such that the stream of molten droplets 22 impacts surface 23 of liquid cryogen 24, whereby at least a portion of liquid cryogen 24 is vaporized, and the droplets are rapidly quenched and solidified to form solid particles 25 suspended in cryogen 24. The action of the arc spray discharge stream impacting surface 23 of the cryogen causes some solid particles and optionally some droplets of cryogen to be entrained in a stream of vaporized cryogen and inert gas which exits vessel 100 through line 111. Makeup cryogen 103 is added to vessel 100 through line 105 in sufficient amount to maintain the desired level of cryogen in the vessel. Distance $D_1$ from the arc gun discharge end to the cryogen surface is greater than about 7 inches, typically between about 7 and 14 inches, and liquid depth $D_2$ is typically between about 1 and 8 inches. A slurry of solid particles and cryogen is withdrawn as desired through line 107 by opening valve 109, and the cryogen is evaporated to recover the particles as a powder product; withdrawal can be carried out continuously or intermittently while arc spray gun 1 is in operation, or alternately can be accomplished after the gun is shut off at the end of a predetermined period of operation.

Vaporized cryogen and inert gas from the arc spray gun, entrained particles, and entrained liquid cryogen flow through line 111 into vessel 200 which contains additional cryogen 201. Entrained particles 205 and entrained cryogen are collected in vessel 200 while being separated from the gas bubbles 204 passing through cryogen 201. A slurry of solid particles and liquid cryogen is withdrawn as desired through line 207 by opening valve 209, and the cryogen is evaporated to recover the particles as a powder product; withdrawal can be carried out continuously or intermittently while arc spray gun 1 is in operation, or alternately can be accomplished after the gun is shut off at the end of a predetermined period of operation. Vessel 200 can be fitted with baffle 211 to improve the separation and retention of particles 205. Liquid cryogen makeup 213 optionally is added through line 215 to replace vaporized cryogen withdrawn through line 217. Vessels 100 and 200 may be connected by line 219 to allow flow of cryogen between vessels and maintain approximately equivalent cryogen levels in both vessels.

Vaporized cryogen and inert gas from the arc spray gun, now substantially free of entrained material, pass through line 217 into water-filled vessel 300. Gas bubbles 303 flow from end 301 of line 217 below water surface 305, thus holding a small positive backpressure in vessels 100 and 200 of greater than about 0.5 inches of water, typically between about 0.5 and 12 inches of water. Any occasional particles carried over from vessel 200 will be retained in vessel 300. Distance $D_3$ is typically between about 0.5 and 6.5 inches. Vaporized cryogen and inert gas from vessel 300 are vented to the atmosphere. Alternately, when the cryogen and the inert gas are both argon, or when the inert gas is helium and the cryogen is argon, it may be desirable to collect and compress the gas for reuse in the arc spray gun.

The powders recovered from vessels 100 and 200 typically may have different particle size distributions, and may be utilized as separate products. Alternately, the two powders can be combined as a single product.

The inert gas used for atomization in the arc spray gun is selected from nitrogen, argon, helium, and mixtures thereof. The liquid cryogen is argon, nitrogen, helium, or possibly a mixture thereof, with nitrogen normally being preferred because of its lower cost relative to argon and helium. The wires comprise one or more metals selected from tin, lead, bismuth, silver, indium, copper, gold, zinc, titanium, zirconium, aluminum, silicon, boron, and nickel. The wires can contain inter-metallic compounds such as NiAl or metal-ceramic composites. The wires also can contain compounds selected from $SiO_2$, $Al_2O_3$, $TiO_2$, $B_4C$, $CrC$, AlN, TiN, and ZrN. The wires both can have the same composition, or alternately two different wires may be used. Optionally, one or both of the wires may be cored wires in which a powder is contained within an outer metal sheath or braided wires consisting of thin wires of different compositions. The method is particularly well-suited for making a powder of lead-tin alloy for use in solder paste for circuit fabrication in the electronics industry. In this application, argon is the preferred atomization gas for the arc spray gun.

The wire and gas feed rates to the arc spray gun and the distance from the spray gun discharge to the surface of the cryogen in the first vessel are selected to give a very high quench rate, preferably in the range of about $10^2$ to about $10^6$ °K/second. This high quench rate yields powders having a very fine, homogeneous internal microstructure. In order to form the appropriately small and spherical molten droplets for rapid solidification, the arc spray gun should be operated such that the mass ratio of the wire feed rate to the atomization gas feed rate is between about 0.005 and 0.8. The wires used are typically between about 0.65 and 2.54 mm in diameter when circular cross-section wire is used. If braided or non-circular cross-section wire is used, the maximum cross-sectional dimension is about 3 mm. The arc spray gun should be operated at a voltage between about 15 and about 42 volts, and at a current between about 30 and 330 amperes. The inert atomizing gas gun pressure, which is the pressure at the end of the wire guides 13 and 15 just before the arc, should be above 5 psig and preferably between about 15 and 45 psig. These gun pressures typically correspond to an external gas supply pressure between about 15 and 150 psig.

The invention is also a powder made by the steps described above containing components selected from those described above. A preferred powder is made from wires of lead-tin alloy which can be used to prepare solder paste for use in circuit board fabrication in the electronics industry. At least a portion of the metal in the powder can have an amorphous, quasi-crystal, nano-crystal, or cellular structure. The mean particle diameter of the powder is typically between about 0.1 and 100 microns depending upon the arc spray gun conditions selected. New alloys can be formed at the wire tips during the melting and atomization steps if the feed wires are cored or braided and thus contain different individual metals.

The invention is also a system for making a metal-containing powder which includes a two-wire electric arc spray gun including a housing, wire feeding means, atomization gas feeding means, power supply means for energizing the wires, and a discharge end, in which the arc spray gun operates to melt the wires to produce a stream of inert atomization gas containing droplets of molten wire material as earlier described. Any type of commercially-available arc spray gun can be utilized without modification; appropriate guns are available from vendors such as Miller-Thermal (USA), Metallization (UK), SNMI (France), Spraytech (Germany), TAFA (USA), or Metco (USA). The system includes a first vessel designed for containing a liquid cryogen and disposed relative to the discharge end of the gun such that the stream of hot atomization gas containing droplets of molten wire material contacts the liquid cryogen, which vaporizes a portion of the liquid cryogen and solidifies the droplets to form metal-containing solid particles. The vessel is preferably insulated to minimize heat leak during operation and particularly during the time between gun operation when the gun is operated intermittently to allow withdrawal of powder product. The first vessel is fitted with a withdrawal line and valve for withdrawing a stream of liquid cryogen containing a portion of the solid particles, and a line for withdrawing a stream containing vaporized cryogen, inert gas, entrained liquid cryogen, and the remaining solid particles. The first vessel is connected to a separate vessel in which the solid particles are recovered as metal-containing powder by evaporating the liquid cryogen. A liquid cryogen supply system is used to introduce makeup cryogen into the first vessel as needed to replace withdrawn cryogen.

The system includes a second vessel suitably designed for containing a liquid cryogen which is connected to the first vessel such that the stream of vaporized cryogen containing entrained liquid cryogen, inert gas, and solid particles flows into the second vessel, where the entrained liquid cryogen and solid particles are separated from the gaseous stream. A stream of liquid cryogen containing the remaining solid particles carried over from the first vessel is withdrawn from the second vessel and is passed to a separator for recovering the remaining solid particles from the liquid cryogen as additional metal-containing powder product. A line is provided for withdrawing from the second vessel a stream of vaporized cryogen and inert gas essentially free of entrained material. The liquid cryogen supply system is utilized to add makeup cryogen to the second vessel to replace withdrawn cryogen. Another line is provided which connects the first and second vessels at points below the liquid cryogen levels in order to allow cryogen to flow freely as needed between the two vessels, which ensures approximately equivalent levels of liquid in each vessel. The distance between the discharge end of the arc spray gun and the surface of the liquid cryogen in the first vessel is between about 7 and 14 inches.

The electric arc spray gun as applied in the present invention is uniquely suited for producing rapidly quenched particles when compared with the plasma arc methods earlier described. The amount of electrical energy required in the arc spray gun is only that amount required to melt the tips of the feed wires; the inert gas supplied to the gun is needed only for atomization, is at ambient temperature, and is heated only slightly while atomizing and propelling the molten metal droplets to the quench liquid. The amount of electrical energy required in a plasma system is much higher, since the feed gas typically is heated to above 3000° C. in order to convert the gas to the plasma state. A small portion of the plasma enthalpy is used to melt the feed metal (which is usually a powder), and the remaining plasma enthalpy is excess and unnecessary relative to the process. Thus for a given amount of molten metal produced, the discharge of an arc spray gun has a much lower total enthalpy than the discharge of a plasma spray gun. For this reason, arc-sprayed droplets can be quenched much more easily than plasma-sprayed droplets.

The powder produced by the process and apparatus described above can be used to make solder pastes for various applications in the electronics industry. The powder, usually an alloy of lead and tin, is mixed with a flux vehicle to yield a paste containing between about 50 and 90 vol % powder; the flux vehicle contains components known in the art which dissolve oxides and promote wetting, and which control viscosity, tackiness, slumping, and drying rate during the soldering process. The powder preferably contains particles with an average diameter between about 1 and 120 microns.

EXAMPLE 1

A powder was made according to the two-stage arc spray process described above using 1600 micron diameter drawn alloy wire containing 60 wt % tin and 40 wt % lead using a commercially available TAFA 8830 arc spray gun. Argon at a supply pressure of 50 psig was used as the atomizing gas, which corresponds to a gun pressure at the wire guides upstream of the arc of 17 psig. The gas was directed at the molten wire tips at the arc using a gun nozzle with a 0.27 inch orifice. Liquid nitrogen was used as the cryogen in the two powder collection vessels. The gun was operated at 50 amperes current and a voltage of 30 volts, which resulted in a wire feed rate of 1.6 grams/second. The gun was operated for 120 seconds, and the powder formed was withdrawn from the first and second vessels and combined into a single powder product. The powder was subjected to particle size analysis using a Microtrack laser beam scattering instrument which indicated a mean particle diameter of 15.2 microns with 85 wt % of the particles having a diameter between 5.5 and 31 microns. Table 1 gives the complete relative and cumulative particle size distributions for two replicate samples of the powder.

TABLE 1

| Particle size, microns | Particle Size Analysis (Microtrack) | |
|---|---|---|
| | Sample 1 | Sample 2 |
| | Relative wt % | |
| 88 | 0 | 0 |
| 62 | 2 | 1 |
| 44 | 6 | 5 |
| 31 | 12 | 12 |
| 16 | 14 | 14 |
| 11 | 14 | 15 |
| 7.8 | 14 | 14 |
| 5.5 | 9 | 9 |
| 3.9 | 8 | 8 |
| 2.8 | 5 | 5 |
| 1.9 | 2 | 2 |
| | Cumulative wt % | |
| 75 | 100 | 100 |
| 53 | 97 | 98 |
| 38 | 91 | 92 |
| 27 | 82 | 82 |
| 19 | 70 | 70 |
| 13 | 55 | 55 |
| 9.4 | 40 | 40 |
| 6.6 | 26 | 25 |
| 4.7 | 16 | 15 |
| 3.3 | 7 | 7 |
| 2.4 | 2 | 2 |

Figure 2:
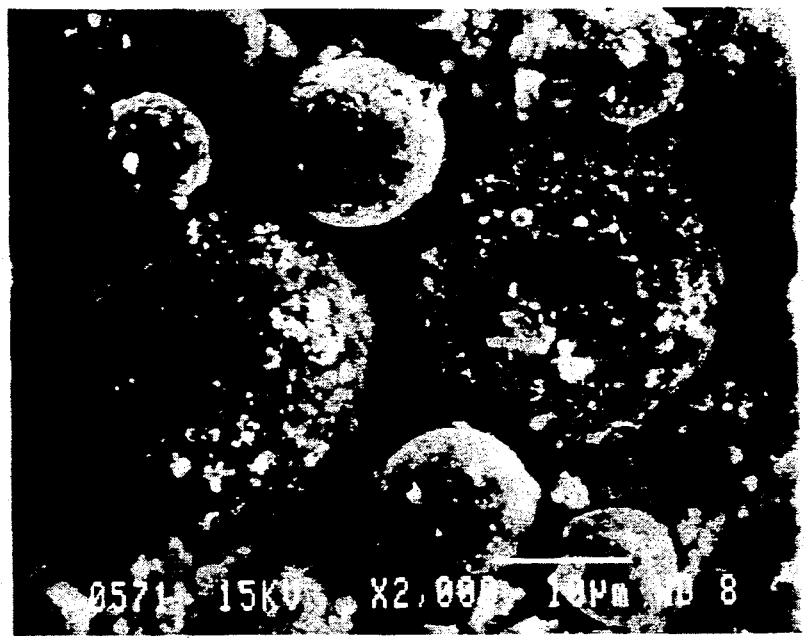
FIG. 2 is a scanning electron micrograph showing the particle topography of a powder of the present invention.
Figure 3:
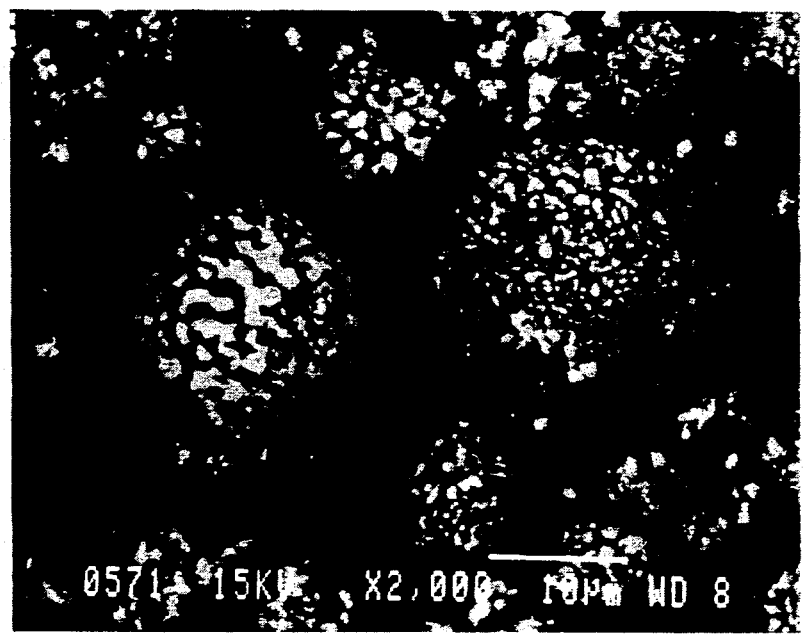
FIG. 3 is a scanning electron micrograph taken by electron microscopy using backscattered electronic imaging showing the very fine metallic microstructure in particles of the powder of FIG. 2.

The powder topography was observed by photomicroscopy as shown in FIG. 2, which indicates that the powder contains a very high fraction of spherical particles. The powder was also observed by electron microscopy using backscattered electronic imaging (FIG. 3), which shows that the powder particles contain a very fine metallic microstructure of lead-rich dendritic regions (light colored) and tin-rich interdendritic regions (dark colored). The dendrite arm spacing is between about 0.5 to 1.5 microns and averages about 1.0 micron.

The cooling rate of the sprayed particles was calculated from this interdendritic spacing by the method described in the earlier-cited reference of Bergmann et al using the equation $$D = B(\epsilon^{-n})$$

where:
D = secondary dendrite arm spacing, microns
B = a constant equal to 60 for the eutectic Sn-Pb alloy used
n = a constant equal to 0.35 for the eutectic Sn-Pb alloy used
=$\epsilon$= droplet cooling rate, °K/second which yielded a quench rate in the range of $10^5$ °K/second for the process of the present invention. This is comparable to the quench rates calculated by Bergmann et al for powders made by atomizing molten metal with high pressure cryogenic liquid jets.

This Example shows that the present technique of injecting molten metal droplets into a stationary cryogen bath yields rapidly-solidified spherical metal powders equivalent to those made by atomizing molten metal with high pressure cryogenic liquid jets as described by Bergmann et al. The method of the present invention, however, does not require a complex high-pressure cryogenic liquid jet system and is therefore a much simpler and smaller system. Because the present invention uses a simple compressed gas jet at moderate pressure to atomize the metal in the arc spray gun, the cost and operating complexity of the entire system are significantly lower than the those of the prior art method of atomization by high pressure cryogenic liquid jets.

EXAMPLE 2

The procedure of Example 1 was repeated using an argon supply pressure of 70 psig, with gun current of 100 amperes and a voltage of 32 volts which gave a wire feed rate of 2.84 grams/second. The collected powder had a mean particle diameter of 11.7 microns with 73 wt % of the particles falling within the range of 5.5 to 31 microns.

EXAMPLE 3

Figure 4:
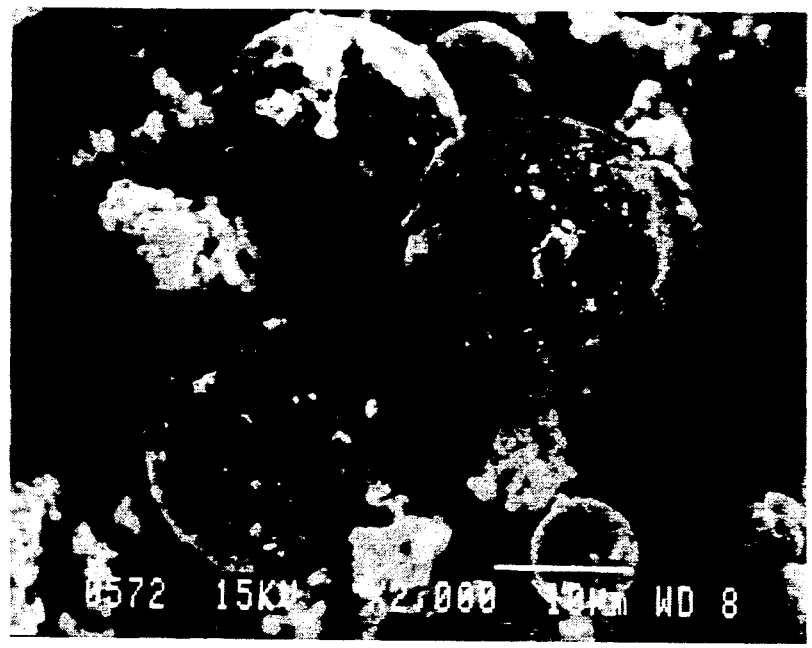
FIG. 4 is a scanning electron micrograph showing the particle topography of another powder of the present invention.
Figure 5:
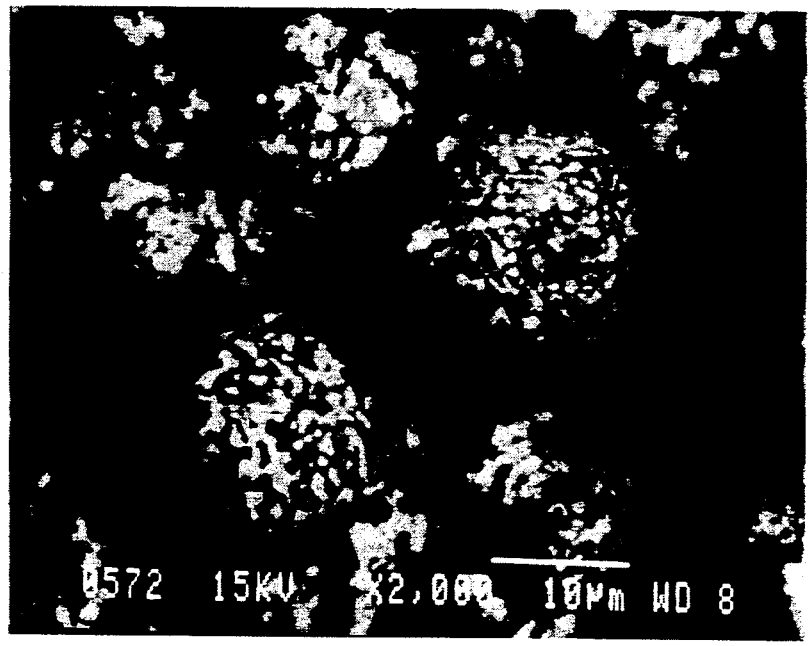
FIG. 5 is a scanning electron micrograph taken by electron microscopy using backscattered electronic imaging showing the very fine metallic microstructure in particles of the powder of the FIG. 4.

The procedure of Example 1 was repeated using nitrogen as the atomizing gas at a supply pressure of 90 psig, with a gun current of 40 amperes and a voltage of 34 volts which gave a wire feed rate of 1.35 grams/second. The collected powder had a mean particle size of 15.2 microns with 85 wt % of the particles falling within the range of 5.5-31 microns. Powder surface topography and microstructure were observed by the methods used in Example 1 and showed similar properties to the powder of Example 1. The topography and microstructure for the powder of Example 3 are shown in FIGS. 4 and 5.

EXAMPLE 4

Differential Scanning Calorimetry (DSC) was used to determine the melting properties of the powder of Example 2. The melting properties of the eutectic wire used to feed the arc spray gun in Example 2 and of a standard eutectic lead-tin soldering powder with a 45-75 micron particle size range of similar composition were also determined for comparison purposes. Each sample was melted in a nitrogen atmosphere at a high 10° K/min heating rate selected to simulate the quick reflowing step with printed circuit boards in infrared or vapor phase furnaces. The thermal energy needed to transform each solid sample to the liquid phase was determined to be 45.8 J/g for the standard powder, 44.9 J/g for the drawn feed wire, and only 36.9 J/g for the powder of Example 2. These results show that the powder of the present invention melts more easily and requires less energy input than the standard powder, and therefore would make a higher performance soldering paste especially in a reflowing step compared with the standard powder. The results also confirm that the rapid quenching during the powder production step results in material with much improved thermal properties compared with the feed wire of the same composition.

Observation of the powders produced in the above Examples showed that the powder particles contained essentially no oxides, which was illustrated by the exothermic and pyrophoric reaction which occurred when a sample of powder was withdrawn from vaporized cryogen directly into the ambient air. When a sample of the original powder was held under vaporized cryogen in a dry box, the powder was black; when a controlled amount of air was admitted slowly into the box, the powder was passivated and changed from black to a grayish-silver color due to the thin oxide layer which formed on the particles.

amples 1-4 and to produce powders in controlled selected size ranges. To illustrate this, the procedures of Examples 1-4 were used with nitrogen as the atomizing gas. Powders were made over a range of gun pressures between about 7 and 24 psig, which corresponds to an external supply pressure range of about 25-45 psig. The arc spray gun was fitted with nozzles having orifice diameters of 0.27, 0.30, and 0.37 inches, and for each nozzle size the gun was operated at current values of 50, 100, and 200 amperes with an arc voltage of 26 volts. The distance from the arc to the liquid nitrogen bath was about 14 inches. The collected powders were analyzed for particle size distribution as in the previous Examples, and the results are given in Tables 2, 3, and 4. These results are plotted in FIG. 6 to illustrate mean particle diameter vs nitrogen atomizing gas flow rate for the three orifice sizes and current values. These results show that the mean particle size (equivalent to particle diameter) strongly increases with decreasing gas flow rate and generally but weakly with increasing nozzle orifice diameter. The effect of current is less pronounced, but usually increasing current increases mean particle size. The use of nitrogen produces somewhat larger particles than the use of argon at similar gun conditions, as can be seen by comparing the results of Example 5 with those of Examples 1-4. Thus metal powders can be produced in specific size ranges by selecting the proper combination of operating variables.

TABLE 2

EFFECT OF CURRENT AND $N_2$ SUPPLY PRESSURE ON PARTICLE SIZE DISTRIBUTION[1][2]
NOZZLE ORIFICE ID: 0.27 INCH

| Run No. | Current, Amps | Supply Pressure psig | $N_2$ Flow, SCFH | Size Range Distribution, Weight % Size Range, microns | | | | | Mean Particle Size, Microns | |
|---|---|---|---|---|---|---|---|---|---|---|
| | | | | <30 | 30-38 | 38-45 | 45-75 | >75 | Run Mean | Flow Rate Mean |
| 1 | 50 | 65 | 3280 | 24 | 45 | 23 | 7 | 1 | 34 | 32 |
| 2 | 100 | 65 | 3280 | 55 | 26 | 10 | 7 | 2 | 27 | |
| 3 | 200 | 65 | 3280 | 24 | 50 | 12 | 13 | 1 | 34 | |
| 4 | 50 | 45 | 2423 | 52 | 33 | 9 | 6 | 0 | 26 | 32 |
| 5 | 100 | 45 | 2423 | 27 | 43 | 14 | 14 | 2 | 34 | |
| 6 | 200 | 45 | 2423 | 34 | 34 | 13 | 17 | 2 | 34 | |
| 7 | 50 | 25 | 1494 | 12 | 18 | 13 | 32 | 25 | 52 | 54 |
| 8 | 100 | 25 | 1494 | 12 | 15 | 12 | 32 | 29 | 53 | |
| 9 | 200 | 25 | 1494 | 4 | 17 | 12 | 28 | 29 | 58 | |

[1]Voltage for stable arc: 26 volts
[2]Distance from gun to liquid $N_2$ surface: 14 ± 1 inches

EXAMPLE 5

The method of the present invention alternately can be used to produce coarser powders than those of Ex-

TABLE 3

EFFECT OF CURRENT AND $N_2$ SUPPLY PRESSURE ON PARTICLE SIZE DISTRIBUTION[1][2]
NOZZLE ORIFICE ID: 0.30 INCH

| Run No. | Current, Amps | Supply Pressure psig | $N_2$ Flow, SCFH | Size Range Distribution, Weight % Size Range, microns | | | | | Mean Particle Size, Microns | |
|---|---|---|---|---|---|---|---|---|---|---|
| | | | | <30 | 30-38 | 38-45 | 45-75 | >75 | Run Mean | Flow Rate Mean |
| 10 | 50 | 65 | 3357 | 51 | 30 | 10 | 8 | 1 | 28 | 31 |
| 11 | 100 | 65 | 3357 | 31 | 47 | 8 | 10 | 4 | 33 | |
| 12 | 150 | 65 | 3357 | 32 | 44 | 11 | 12 | 1 | 32 | |
| 13 | 50 | 45 | 2504 | 20 | 39 | 15 | 18 | 8 | 39 | 38 |
| 14 | 100 | 45 | 2504 | 23 | 48 | 12 | 10 | 7 | 36 | |
| 15 | 150 | 45 | 2504 | 28 | 27 | 15 | 22 | 8 | 39 | |
| 16 | 50 | 25 | 1535 | 4 | 15 | 10 | 30 | 41 | 59 | 56 |
| 17 | 100 | 25 | 1535 | 11 | 14 | 12 | 35 | 28 | 54 | |
| 18 | 150 | 25 | 1535 | 12 | 12 | 11 | 32 | 33 | 55 | |

[1]Voltage for stable arc: 26 volts
[2]Distance from gun to liquid $N_2$ surface: 14 ± 1 inches

TABLE 4
EFFECT OF CURRENT AND N₂ SUPPLY PRESSURE ON PARTICLE SIZE DISTRIBUTION[1][2]
NOZZLE ORIFICE ID: 0.37 INCH

| Run No. | Current, Amps | Supply Pressure psig | N₂ Flow, SCFH | Size Range Distribution, Weight % | | | | | Mean Particle Size, Microns | |
|---|---|---|---|---|---|---|---|---|---|---|
| | | | | Size Range, microns | | | | | Run Mean | Flow Rate Mean |
| | | | | <30 | 30-38 | 38-45 | 45-75 | >75 | | |
| 19 | 50 | 65 | 3396 | 40 | 36 | 13 | 10 | 1 | 30 | 32 |
| 20 | 100 | 65 | 3396 | 32 | 29 | 14 | 13 | 2 | 33 | |
| 21 | 200 | 65 | 3396 | 38 | 35 | 13 | 13 | 1 | 32 | |
| 22 | 50 | 45 | 2545 | 24 | 32 | 16 | 22 | 6 | 39 | 40 |
| 23 | 100 | 45 | 2545 | 29 | 26 | 15 | 23 | 7 | 39 | |
| 24 | 200 | 45 | 2545 | 24 | 25 | 13 | 26 | 12 | 42 | |
| 25 | 50 | 25 | 1575 | 11 | 12 | 10 | 32 | 35 | 56 | 56 |
| 26 | 100 | 25 | 1575 | 9 | 14 | 10 | 30 | 37 | 56 | |
| 27 | 200 | 25 | 1575 | 7 | 15 | 10 | 31 | 37 | 57 | |

[1] Voltage for stable arc: 26 volts
[2] Distance from gun to liquid N₂ surface: 14 ± 1 inches Powders produced by the process of the present invention are useful in any application requiring fine, free-flowing spherical metal or metal-containing particles. Examples include ferrous or super-alloy powders for automotive or aerospace parts; refractory metal alloy powders; metal injection-molding powders; magnetic or microwave and radiation absorbing media for the electronics, printing, and defense industries; fillers for conductive plastics; and composite or amorphous powders for novel high-temperature or wear applications. The metal powders are also oxide-free and possess superior melting properties due to the high quench rates during particle formation which results in highly uniform composition. Based on these properties, the powders are uniquely well-suited for use in solder pastes for reflowing soldering operations in the electronics industry. Current commercial solder pastes contain a relatively large fraction of chemical fluxing agents which act to dissolve the oxides present in typical solder powders. These fluxes are very effective at dissolving oxides, but are very corrosive to the completed soldered circuit boards and must be removed by a freon or terpene rinsing step. The rinse residue is hazardous and presents disposal problems. Non-oxidizing atmospheres for solder paste reflowing, such as vapor phase reflowing or reflowing in a belt furnace under an inert atmosphere, eliminate the formation of oxides during reflowing, but cannot eliminate oxide films which formed earlier on the powder particles. The use of solder pastes containing oxide-free or nearly oxide-free powders of the present invention would greatly reduce the amount of flux needed and thus also reduce flux removal rinse requirements in solder reflowing operations.

The use of improved solder paste with a higher metal fraction and a lower chemical vehicle fraction compared with current commercial paste will result in less residue on soldered components, which will reduce the need for cleaning and reduce product defect rates. Such an improved paste can be prepared from the powder of the present invention, which has finer particles than the currently-used powders having particles in the 45-90 micron range. Finer powders are also required in high-density components where the distances between adjacent contact pads are less than 100 microns. In addition, finer powders with finer and more uniform microstructure respond more effectively to heating during reflowing operations, and the faster metal melting will promote better solder joints. Alternately, the reflowing time can be shortened or the excess temperature can be reduced, which in turn will reduce the formation of microcracks in the plastic portions of the soldered components. The powder of the present invention possesses the fine particles and microstructure necessary to make improved solder paste with these improved performance characteristics.

The method of the present invention has several advantages over the methods of the earlier-described references for making fine metal powders. The use of plasma spray to form liquid droplets for solidification into powder imparts a much higher temperature to the gas-droplet mixture compared with the use of an electric arc spray. As a result, the quench rate of plasma-sprayed droplets is lower than that of arc-sprayed droplets, and the particles from a plasma spray process will not have the desirable microstructure obtained with the present arc spray method. In addition, cryogen consumption due to vaporization will be much higher for the plasma spray process than for the arc spray process of the present invention. These two advantages are the result of inherent thermal differences between plasma arc spray and an electric arc spray systems. The amount of electrical energy necessary to produce a plasma and melt the metal feed material is much higher than the amount needed to melt metal wires in an electric arc. Thus the enthalpy of a plasma arc discharge, which contains molten metal droplets and very hot gases, is much higher than the enthalpy of an electric arc spray discharge, which contains molten metal droplets and relatively cool gases at near-ambient temperatures. In addition, costs for plasma spray systems are generally much higher than for arc spray systems.

The alternate method of atomizing liquid metal by high-velocity liquid cryogen streams produces fine, rapidly-quenched, oxide-free powders, but requires more complex and expensive equipment compared with the arc spray system of the present invention. In addition, the liquid cryogen atomization method cannot be used for small batches of expensive solder powders, for rapid changeover from one metal to another, and for controlling product particle size distribution.

The essential characteristics of the present invention are described fully and completely in the foregoing disclosure. One skilled in the art can understand the invention and make various changes and modifications thereto without departing from the basic spirit thereof and without departing from the scope and range of equivalents of the claims which follow.

We claim:

1. A method for producing metal-containing powder comprising:
   (a) forming an electric arc between two metal-containing wires in an electric arc spray gun, thereby causing said wires to melt;
   (b) directing pressurized inert gas across said arc to form molten droplets which are discharged with said inert gas from said gun;
   (c) contacting said molten droplets and inert gas discharged from said gun with a liquid cryogen, thereby solidifying said molten droplets to form solid particles having an average particle size between 1 and 120 microns, cooling said inert gas, vaporizing at least a portion of said liquid cryogen, and forming a mixture of cryogen, cooled inert gas, and said solid particles;
   (d) separating said solid particles from said mixture to yield said metal-containing powder.

2. The method of claim 1 wherein said inert gas is selected from the group consisting of nitrogen, argon, helium, and mixtures thereof.

3. The method of claim 1 wherein said liquid cryogen is selected from the group consisting of nitrogen, argon, helium, and mixtures thereof.

4. The method of claim 1 wherein said wires comprise one or more metals selected from the group consisting of tin, lead, bismuth, silver, indium, copper, gold, zinc, titanium, zirconium, aluminum, silicon, boron, and nickel.

5. The method of claim 4 wherein said wires further comprise one or more compounds selected from the group consisting of $SiO_2$, $Al_2O_3$, $TiO_2$, $B_4C$, $CrC$, $AlN$, $TiN$, and $ZrN$.

6. The method of claim 4 wherein said wires comprise lead and tin.

7. The method of claim 1 wherein the quenching rate of said droplets is in the range of about $10^2$ to about $10^6$ °K/second.

8. The method of claim 1 wherein said electric arc spray gun is operated such that the mass ratio of the feed rate of said wires into said arc to the feed rate of said inert gas is between about 0.005 and about 0.8.

9. The method of claim 1 wherein said electric arc spray gun is operated at a voltage between about 15 and about 42 volts.

10. The method of claim 1 wherein said electric arc spray gun is operated at a current between about 30 and about 300 amperes.

11. The method of claim 1 wherein said wires are between about 0.65 and about 2.54 mm in diameter.

12. The method of claim 1 wherein said electric arc spray gun is operated at an inert gas gun pressure of between about 5 and about 45 psig.

13. A method for producing metal-containing powder comprising:
   (a) forming an electric arc between two metal-containing wires in an electric arc spray gun, thereby causing said wires to melt;
   (b) directing pressurized inert gas across said arc to form molten droplets which are discharged with said inert gas from said gun;
   (c) passing said molten droplets and inert gas discharged from said gun into a vessel containing a liquid cryogen, thereby solidifying said molten droplets to form solid particles, cooling said inert gas, and vaporizing at least a portion of said liquid cryogen, and
   (d) withdrawing from said vessel a mixture of liquid cryogen and solid particles suspended therein, vaporizing the liquid cryogen in said mixture, and recovering said solid particles to yield said metal-containing powder.

14. The method of claim 13 further comprising the introduction of additional liquid cryogen to said vessel to replace cryogen withdrawn therefrom.

15. A method for producing metal-containing powder comprising:
   (a) forming an electric arc between two metal-containing wires in an electric arc spray gun, thereby causing said wires to melt;
   (b) directing pressurized inert gas across said arc to form molten droplets which are discharged with said inert gas from said gun;
   (c) passing said molten droplets and inert gas discharged from said gun into a first vessel containing a liquid cryogen, thereby solidifying said molten droplets to form solid particles, cooling said inert gas, vaporizing a portion of said liquid cryogen, and forming a mixture of liquid cryogen, vaporized cryogen, cooled inert gas, and said solid particles;
   (d) withdrawing from said first vessel a stream of liquid cryogen and solid particles suspended therein, vaporizing the liquid cryogen, and recovering said solid particles to yield a first fraction of said metal-containing powder;
   (e) withdrawing from said first vessel a mixture of cool inert gas, vaporized cryogen, entrained liquid cryogen, and entrained solid particles, and passing said mixture into a second vessel containing additional liquid cryogen wherein said entrained liquid cryogen and said entrained solid particles are separated from said vaporized cryogen and cool inert gas;
   (f) withdrawing from said second vessel a stream of vaporized cryogen and cool inert gas essentially free of entrained material; and
   (g) withdrawing from said second vessel a mixture of liquid cryogen and solid particles suspended therein, vaporizing the liquid cryogen in said mixture, and recovering said solid particles to yield a second fraction of said metal-containing powder.

16. The method of claim 15 further comprising the introduction of additional liquid cryogen to said first and second vessels to replace liquid and vapor cryogen withdrawn therefrom.

17. The method of claim 15 wherein the pressure in said first vessel and the pressure in said second vessel are greater than about 0.5 inches of water.

18. The method of claim 15 wherein said first and second fractions of said metal-containing powder are combined into a single powder product.

* * * * *